United States Patent Office 3,472,215
Patented Oct. 14, 1969

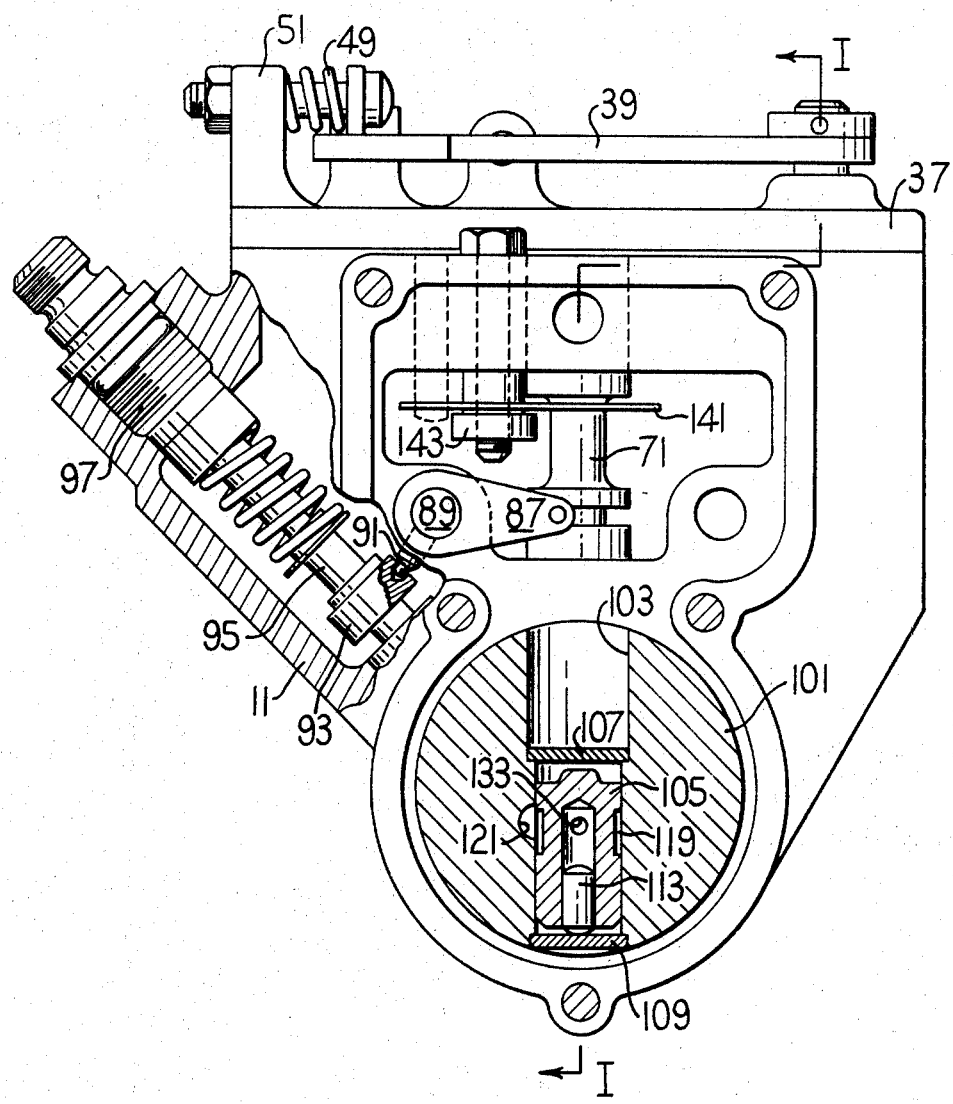

3,472,215
ENGINE GOVERNOR RESPONSIVE TO SPEED
AND FUEL PRESSURE
Carl R. Maxwell, Washington, and Robert H. Miller and
John H. Parks, Peoria, Ill., assignors to Caterpillar Tractor Co., Peoria, Ill., a corporation of California
Filed Dec. 13, 1967, Ser. No. 690,242
Int. Cl. F02d 1/02; F02n 59/06
U.S. Cl. 123—140                                        8 Claims

ABSTRACT OF THE DISCLOSURE

An engine governor which controls the volume of fuel injected into the engine by means of a piston within the governor body. One end of the piston is actuated by the full pressure of the fuel within the governor body and the other end of the piston is actuated by fluid under a pressure regulated by the centrifugal force exerted on a valve as a result of the engine speed. The speed is balanced between the forces to control, through linkage, the volume of fluid injected into the combustion or precombustion chambers of the engine by regulating the position of a spill port collar on a fuel pump valve plunger.

---

In controlling the speed of engines many governors in use today require sensitive valves, flyweights and other expensive parts. In many of the governors, a spring biased valve is controlled by a set of flyweights which are acted upon by the centrifugal force exerted by the revolution of a shaft within the governor. The various tolerances and fits within such a governor cause the manufacture and maintenance thereof to be expensive.

It is an object of the present invention to provide a governor which obviates the necessity for flyweights and instead develops a control pressure as a function of engine speed which, acting against a reference pressure, controls engine power and speed.

It is also an object of the present invention to provide a governor employing a speed sensitive pressure regulating valve.

It is also an object of the present invention to provide a governor for controlling engine speed by establishing a reference fluid pressure on a control system thereby allowing the use of a single housing for both the fuel pump and governor.

It is a further object of the instant invention to provide a governor in a housing also enclosing a fuel pump, thereby providing a compact, low-cost governor using a minimum number of parts.

It is also an object of the present invention to provide a simple inexpensive governor which can be used with in-line or V-type fuel pumps.

It is also an object of the invention to provide a governor with a minimum number of parts and external lines and which is connected to the unit it controls.

It is also an object of the invention to provide a governor in which the volume of fuel injected into each combustion chamber is regulated by a piston responsive to fluid pressure in the governor body and oppositely responsive to fluid pressure regulated by a speed responsive valve.

It is also an object of the invention to provide a governor wherein the engine operator may control the engine speed between high and low idle speeds by controlling the pressure of fuel within a unitary governor-fuel pump body.

Other objects of the invention will become apparent to those skilled in the art upon reading of the following description of a preferred embodiment of the invention as depicted in the drawings which are intended to illustrate but not to restrict the scope of the invention. Other embodiments or equivalents of the invention will be obvious to those skilled in the art without departing from the scope of the invention as defined in the appended claims.

Referring now to the drawings:

FIG. 5 shows a view of the means actuated by the governor to control the fuel injection, taken along a line V—V of FIG. 1.

Figure 1:
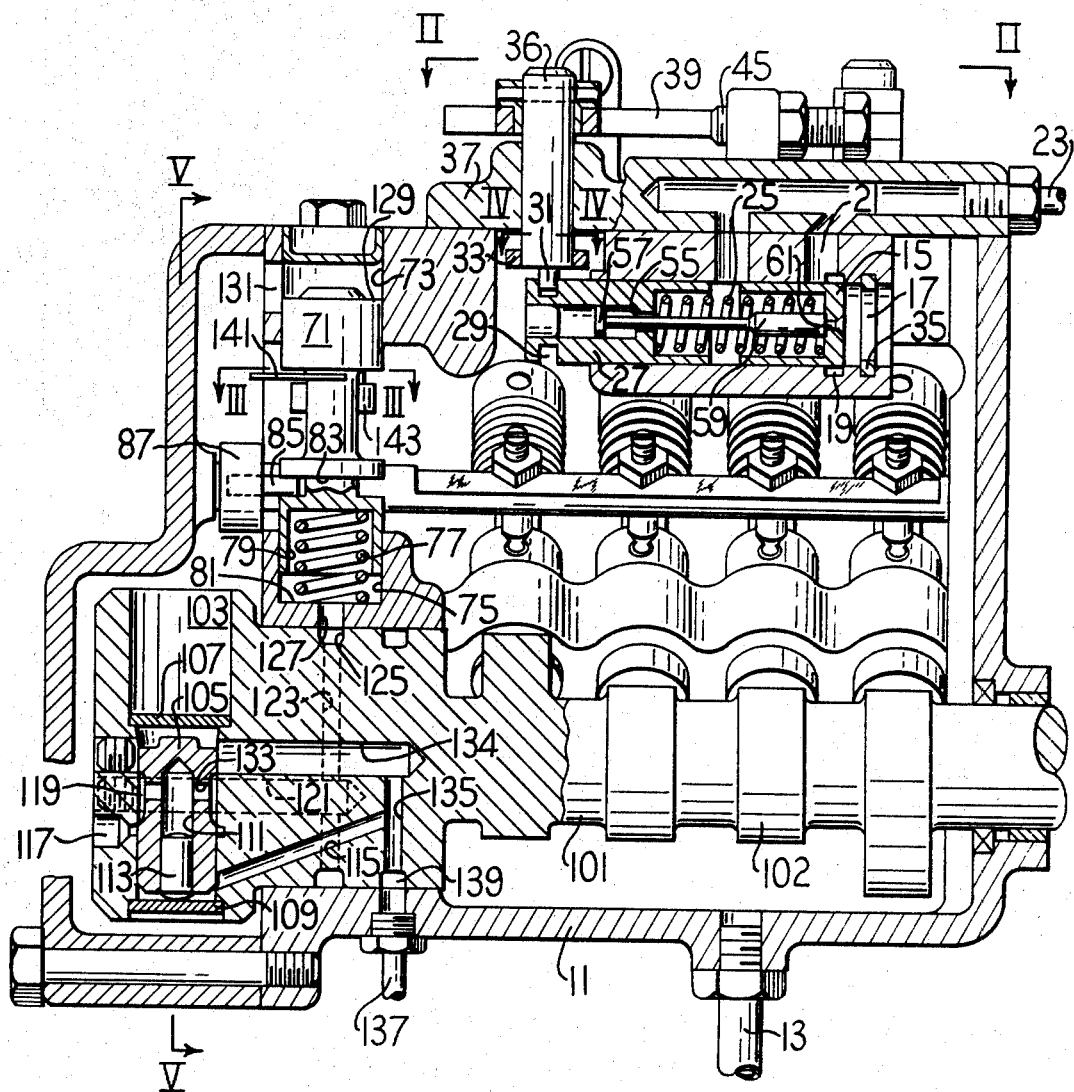
FIG. 1 shows an interior side view of the preferred embodiment of the governor partly in section.

Now referring to the drawings in greater detail, the figures show a housing 11 which encases the governor and fuel pump. Fuel enters the housing through a line 13 filling the housing. Fuel pressure in housing 11 acts upon a valve 15 and tends to open the valve by moving it to the left as shown in FIG. 1, causing the fuel to flow through a passage 17, a groove 19, a passage 21, and out a return line 23.

In order to control the power output of the engine, the operator thereof, in utilizing the present invention, controls the pressure within the housing by the following means. Mounted concentric to valve 15 within the housing 11 are a spring 25 and a spool 27. Spring 25 seats in valve 15 at one end and in the spool 27 at the other end. Spool 27 has a groove 29 formed therein, into which a dowel 31, mounted on a lever 33, is positioned so as to move the spool 27 axially.

Movement of the spool 27 to the right by means of the dowel 31 causes spring 25 to exert a force against valve 15 until it is pushed against a stop 35. Further movement of the spool to the right will increase the preload in the spring. When valve 15 is moved against stop 35, the fuel entering the housing through line 13 must then exert a greater pressure against the face of the spool so as to move it to the left, as shown in FIG. 1, so as to allow the fuel to flow through the return line 23. Thus the fuel pressure must rise to a value greater than the force exerted by spring 25.

As shown in FIG. 1, movement of the dowel 31 to the left, thereby moving spool 27 to the left, will decrease the force exerted by spring 25 and therefore less fuel pressure will be required to open valve 15.

Lever 33 is fixedly mounted on a shaft 36 which, in turn, is rotatably mounted in a cover 37 of housing 11. Fixedly mounted on the upper end of shaft 36 is a control lever 39 which is actuated by a throttle linkage 41 connected to lever 39 at a point 43. Linkage 41, of course, is attached to an accelerator pedal, handle, etc.

With the engine running and control lever 39 moved against a high idle screw 45, a relatively high pressure is obtained in housing 11. The high idle speed position of control lever 39 is indicated by phantom position A in FIG. 2.

Figure 2:
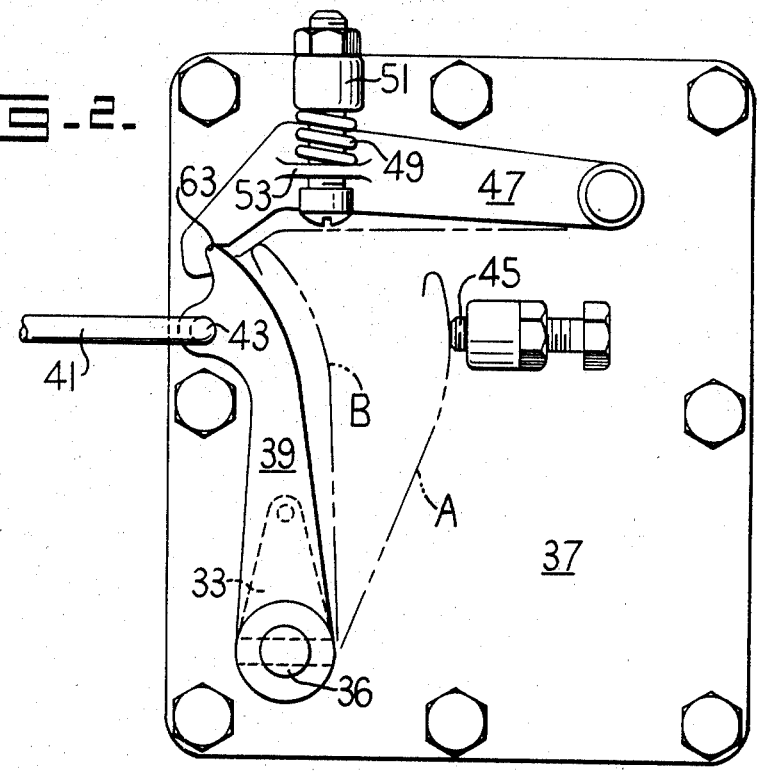
FIG. 2 shows a plan view of the governor taken along the line II—II of FIG. 1.

To obtain a low idle speed, lever 39 is moved to phantom position B as shown in FIG. 2. This position is determined by a lever 47 having a spring 49 which acts between a boss 51 of cover 37 and a seat 53 on lever 47. When lever 39 is moved against lever 47 as shown by phantom position B, additional force is required to move control lever 39 against the force of spring 49. This indicates to the operator that a low idle position has been reached. Reference pressure can thus be determined between low and high idle by movement of control lever 39 between phantom positions A and B.

In order to bring the engine to a complete stop, control lever 39 is moved in a counterclockwise direction, past the low idle position speed, to the position shown in full detail in FIG. 2. As this action takes place, a shoulder 55 of spool 27 engages a shoulder 57 of a shaft 59 which is attached to valve 15 at a point 61; this pulls valve 15 into an open position, and when control lever 39 engages notch 63 of lever 47, valve 15 has been pulled to a fully opened position which allows a free flow of fluid through housing 11 from supply line 13 to return line 23.

A piston 71 is slidably mounted in a coaxial set of bores 73 and 75 in housing 11. The piston is biased upwardly by means of a spring 77 which extends between a counterbore 79 of piston 71 and a face 81 of bore 75. Piston 71 contains a groove 83 into which is positioned a dowel 85 which is secured to a lever 87. As shown in FIG. 5, lever 87 is fixedly mounted on a shaft 89 to which is also fixedly mounted an actuating bar 91. The actuating bar is in turn mounted in a groove in a volume control spill port collar 93 mounted on a plunger 95 of fuel pump bonnet 97.

As shown in the assignee's copending application Ser. No. 621,213, of Miller et al., filed Mar. 7, 1967, a movement of the volume control collar 93 relative to plunger 95 controls the volume of fuel which passes through fuel pump bonnet 97. Thus the movement of piston 71 upwardly or downwardly controls the volume of fuel which is injected into the combustion or precombustion chambers of the engine. More specifically, upward movement of piston 71 turns lever 87 in a counterclockwise direction about its pivot shaft 89 thereby decreasing the volume of fuel entering the combustion chambers, which in turn cause a decrease in engine speed. When piston 71 is moved downwardly, by means hereinafter described, lever 87 is moved in a clockwise direction increasing the volume of fuel injected, thereby increasing the engine power.

Referring once again to FIGS. 1 and 5, there is shown a fuel pump cam shaft 101 having a bore 103 perpendicular to the axis of the cam shaft. Cam shaft 101 carries cams 102 thereon which actuate the plungers 95 in a manner and for a purpose described in the above cited copending application. Within bore 103 there is situated a pressure modulating valve member 105 between plugs 107 and 109 which limit the travel of valve member 105. Valve 105 contains a concentric bore 111 containing a free sliding slug 113. As cam shaft 101 rotates, valve 105 and slug 113 are moved outwardly relative to the axis of the cam shaft by centrifugal force. A drain passage 115 is provided so as to obviate the problem of hydraulic lock at the outer end of modulating valve 105.

As centrifugal force moves slug 113 and valve 105 radially outwardly relative to the axis of cam shaft 101, fuel under pressure enters passage 117 in the end of the cam shaft, passes around an annulus 119 of valve 105, and thereafter passes through passages 121 and 123 entering an annular groove 125 in the cam shaft 101. From groove 125 fluid is passed through passage 127 and into bore 75. Thus fluid under pressure—at a pressure less than the reference pressure in housing 11—enters bore 75 and cooperates with spring 77 to exert a pressure on the lower side of piston 71.

The fluid under reference pressure in housing 11 also enters bore 73 through passage 131 thereby exerting its full force directly on the top 129 of piston 71.

As the fluid enters the annulus surrounding valve 105, it also enters bore 111 in the valve through passages 133 therein. When engine speed decreases, fluid pressure in the bore 111 acts between slug 113 and valve 105 overcoming at least some of the centrifugal force acting upon the valve 105. The fluid pressure causes the valve to tend to move radially inwardly toward the axis of the cam shaft 101 while retaining slug 113 in the radially outward position. As valve 105 is moved radially inwardly, communication between passage 117 and annulus 119 becomes cut off by the wall of bore 103. Thus the pressure acting within bore 75 on the bottom of piston 71 is limited. Further inward motion of pressure modulating valve 105 will cause annulus 119 to communicate with passage 134, thus bleeding fluid from annulus 119 and reducing pressure acting within bore 75 on the bottom of piston 71. Then, the reference pressure acting against surface 129 of the valve 71, which has, up until this point, been balanced by the fluid pressure in bore 75, together with the biasing force of spring 77, now overcomes the forces exerted on the lower part of piston 71, forcing the piston downwardly. Fluid is thereby forced from bore 75 through passage 127, groove 125, passages 123 and 121, into annulus 119. Since modulating valve 105 has moved axially inwardly, annulus 119 connects passage 121 and passage 134. Passage 134 serves to transfer the fuel brought from bore 75 to a passage 135 which, in turn, leads to a return line 137 through an annular groove 139 in the cam shaft 101.

Since piston 71 is moved downwardly, it serves to rotate lever 87 in a clockwise direction thereby raising collar 93 on plunger 95. This, as previously stated, increases the volume of fuel transferred to the combustion chamber. Engine power is thereby increased by the downward movement of piston 71 to compensate for the increased load on the engine. As power is increased, the rotational speed of cam shaft 101 is also increased, once again exerting an increased centrifugal force on valve 105, thereby causing annulus 119 to move radially outward so as to connect passage 117 with passage 121. Once again, the valve meters fuel under pressure into bore 75 and, together with the force exerted by spring 77, serves to balance the force exerted against surface 129 by the reference pressure in housing 11, until the proper speed is reached for engine loading.

Figure 3:
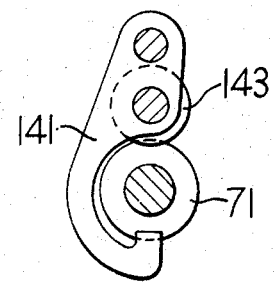
FIG. 3 shows a portion of a biasing stop means within the governor taken along a line III—III of FIG. 1.
Figure 4:
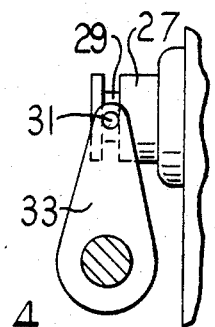
FIG. 4 shows a view of the governor regulating means taken along a line IV—IV of FIG. 1.

Downward movement of piston 71 is limited by a resilient full load stop 141. As shown in FIG. 3, resilient stop 141 is maintained within a predetermined range of bending arc by means of a fixed stop 143.

Thus fluid under pressure in housing 11 and fluid under pressure in bore 75, together with spring 77, determine the position of piston 71 which in turn determines the volume of fuel injected into the combustion or precombustion chamber of the engine. As the engine speed is changed due to an increase or a decrease in load, the pressure in bore 75, controlled by valve 105, is changed thereby regulating the position of piston 71 causing a resultant increase or decrease in engine speed.

Additionally, when the engine operator releases the throttle or desires to slow the engine down, movement of lever 39 toward the low idle position allows fuel to flow past valve 15 to the return line 23. This lowers the reference pressure in housing 11, causing piston 71 to rise, lowering collar 93. Thus, the volume of fuel injected is reduced, slowing the engine and piston 71 assumes a new balanced position due to the action of metering valve 105.

Thus it can now be seen that applicants have provided a new and improved governor mechanism wherein the vehicle operator controls the reference pressure of fuel within the governor and fuel pump body and, thereby, the engine speed by controlling the volume of fuel injected into the engine. Therefore either a change in the fuel reference pressure caused by the operator or a change in the engine speed caused by an increase or decrease in the load on the engine regulates the engine speed without the necessity of an intricate flyweight system.

We claim:

1. In a governor, a body having a fluid inlet and a fluid outlet, a manually operated fluid pressure regulator valve in the body between the fluid inlet and outlet and operative to create a reference fluid pressure in the body, a piston in the body motivated in a first direction by the reference pressure, a modulating valve in the body passing fluid from the body to the piston to motivate it in a second direction at a pressure dependent upon the speed of the engine controlled by the governor, and linkage means connecting the piston to a fuel pump bonnet volume control means for controlling the quantity of fuel passing through the injector.

2. In the governor of claim 1, a shaft rotatably mounted in the body, the modulating valve mounted within the shaft and means in the modulating valve positioning it relative to the axis of the shaft by centrifugal force caused by rotation of the shaft and also positioning it in accordance with the fluid pressure created by the regulator valve.

3. The governor of claim 1 including a biasing means acting on the piston to motivate it in the second direction.

4. The governor of claim 1 wherein the volume control means allows fluid to be dumped from the injector after a constant speed producing flow of fuel has passed through the injector.

5. The governor of claim 4 including means in the body adjacent to the linkage means for limiting the travel of the piston so as to limit the maximum amount of fuel passing through the injectors.

6. In an engine governor, a body having a fluid inlet and fluid outlet manually actuated means controlling the pressure of the fluid within the body, a piston within the body motivated in a first direction by the pressurized fluid in the body acting on a first surface thereof, a modulating valve in the body transferring fluid from the body to a second surface on the piston at a pressure regulated by the speed of the engine controlled by the governor and by the fluid pressure in the body to motivate the piston in a second direction, linkage means connecting the piston to a fuel pump bonnet means, and a spill port collar attached to the linkage means to control the amount of fuel injected into the engine.

7. In a governor, a body having a fluid inlet and a fluid outlet, a manually operated valve in the body creating a reference pressure in the fluid within the body, a piston within the body motivated in a first direction by the fluid at the reference pressure acting on a first surface thereof, a biasing means in the body acting on the piston to motivate it in a second direction, a shaft in the body having a centrifugally actuated modulating valve therein, and means in the shaft passing fluid at the reference pressure through the modulating valve to a second surface of the piston so as to motivate it in the second direction in cooperation with the biasing means, and means in the modulating valve controlling the pressure of the fluid delivered to the second surface in accordance with the rotational speed of the shaft.

8. In the governor of claim 7, means in the modulating valve also controlling the pressure of the fluid delivered to the second surface in accordance with the reference pressure created by the manually operated valve.

References Cited

UNITED STATES PATENTS

| 3,000,369 | 9/1961 | Bischoff | 123—139.13 |
| 3,289,590 | 12/1966 | Hutcheon | 103—2.1 |
| 3,385,276 | 5/1968 | Reiners et al. | 123—140 |

LAURENCE M. GOODRIDGE, Primary Examiner

U.S. Cl. X.R.

103—2.1, 54

PO-1050
(5/69)

UNITED STATES PATENT OFFICE
CERTIFICATE OF CORRECTION

Patent No. 3,472,215            Dated October 14, 1969

Inventor(s) CARL R. MAXWELL, et al

It is certified that error appears in the above-identified patent and that said Letters Patent are hereby corrected as shown below:

Column 1, line 19, the last occurring "speed" should read --piston--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents